US008694913B2

(12) United States Patent
Kim et al.

(10) Patent No.: US 8,694,913 B2
(45) Date of Patent: *Apr. 8, 2014

(54) APPARATUS AND METHOD FOR MANAGING LAYOUT OF A WINDOW

(75) Inventors: Young-Kuk Kim, Suwon-si (KR); Sung-min Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 865 days.

This patent is subject to a terminal disclaimer.

(21) Appl. No.: 12/839,794

(22) Filed: Jul. 20, 2010

(65) Prior Publication Data

US 2010/0287496 A1 Nov. 11, 2010

Related U.S. Application Data

(63) Continuation of application No. 11/670,178, filed on Feb. 1, 2007, now Pat. No. 7,783,989.

(30) Foreign Application Priority Data

Feb. 14, 2006 (KR) ........................ 10-2006-0014264

(51) Int. Cl.

*G06F 15/00* (2006.01)
*G06F 13/00* (2006.01)

(52) U.S. Cl.

USPC ........................................... 715/794; 715/790

(58) Field of Classification Search

USPC ................. 715/781, 794, 517, 788, 801, 790, 715/815–816; 345/156, 145

See application file for complete search history.

(56) References Cited

U.S. PATENT DOCUMENTS 5,487,143 A * 1/1996 Southgate ..................... 715/790
7,484,182 B1 * 1/2009 Smith ........................... 715/794

* cited by examiner

*Primary Examiner* — Cao "Kevin" Nguyen
(74) *Attorney, Agent, or Firm* — Jefferson IP Law, LLP

(57) ABSTRACT

An apparatus and method for managing the layout of a window is provided. The apparatus includes a display unit that displays the window on a screen; the screen is divided into a plurality of display areas; a pointer-position-checking unit that checks the coordinate position of a pointer moved by a user and determines the one display area corresponding to the position of the checked pointer; and a window-size-adjusting unit that moves the window to the one display area where the pointer is positioned and adjusts the size of the window in proportion to the size of the one display area.

6 Claims, 17 Drawing Sheets

APPARATUS AND METHOD FOR MANAGING LAYOUT OF A WINDOW

CROSS-REFERENCE TO RELATED APPLICATIONS

This application is a continuation application under 35 U.S.C. §120 of a U.S. patent application Ser. No. 11/670,178, filed Feb. 1, 2007, which claims the benefit under 35 U.S.C. §119(a) of a Korean patent application serial No. 10-2006-0014264, filed Feb. 14, 2006, in the Korean Intellectual Property Office, the entire disclosure of which is hereby incorporated by reference.

BACKGROUND OF THE INVENTION

1. Field of the Invention

Aspects of the present invention relate to managing the layout of a window. More particularly, aspects of the present invention relate to a method and apparatus for managing the layout of a window, by which a user can conveniently display and use multiple windows by dividing a plurality of display areas.

2. Related Art

The screen size of computer monitors has been increasing over time. However, despite large screens, only one program window is usually open on a screen, and when multiple windows are open on the screen, a small window is usually open on top of the window of a main program. Both of these situations are not efficient considering the large size of the screen, and because the small window covers another window, inconvenient for the user. The user could manually adjust the size of the windows, but it is inconvenient because the user must adjust each window.

FIGS. 1A through 1D illustrate windows displayed on the screen of a conventional computer monitor. As illustrated, multiple windows (a first window 11 and a second window 12) are displayed on a screen 10 of a computer monitor. A user adjusting the position and the size of the first window 11 is shown in FIG. 1B. As shown in FIG. 1B, the user selects the first window 11, reduces the width and extends the height of the first window 11, and then moves the first window 11 left a predetermined distance. This allows the first window 11 and the second window 12 to be displayed without the windows overlapping. Next, the user selects the second window 12 and adjusts its size as shown in FIG. 1C. This allows the height of the second window 12 to be increased without covering the first window 11, as shown in FIG. 1D.

Whenever the user wants to use multiple windows on one monitor screen, the user must adjust the size and position of each displayed window, which is inconvenient for the user. Further, in the case where multiple windows are simultaneously displayed using an option such as "always on screen," the windows are overlapped.

Korean Patent Publication No. 2005-78690 (Method for Displaying Partial Window Screen) consists of a configuration utility that sets a window screen division and an execution utility to display a partial window in a maximized state. When a user sets the whole window to be divided into a size specified by the user, the set partial-window-screen area information is stored in memory. Windows programs are then individually executed and displayed in each partial window and are displayed in their maximized state. After the display is divided into multiple partial windows, if multiple windows are displayed, the windows are displayed on their preset partial window screen. If the user ends the partial window display, a conventional window screen layout is displayed. The drawbacks of this system are that the user cannot move a window to an arbitrary area on the screen by a drag and drop, and the set partial size cannot be arbitrarily changed by the user.

SUMMARY OF THE INVENTION

An aspect of the present invention relates to the use of multiple windows conveniently by dividing a screen into a plurality of display areas.

Another aspect of the present invention relates to adjusting the size of a window in proportion to the size of a predetermined display area when the window is positioned in the predetermined display area among a plurality of display areas.

The present invention will not be limited to the aspects and embodiments described herein. Other aspects and embodiments not described herein will be more definitely understood by those of ordinary skill in the art from the following detailed description.

According to an embodiment of the present invention, there is provided an apparatus for managing the layout of a window, the apparatus including a display unit that displays the window and a plurality of display areas; a pointer-position-checking unit that checks a coordinate position of a pointer moved by a user and determines one of the display areas corresponding to the position of the checked pointer; and a window-size-adjusting unit that moves the window to the one display area where the pointer is positioned and adjusts the size of the window in proportion to the size of the one display area.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
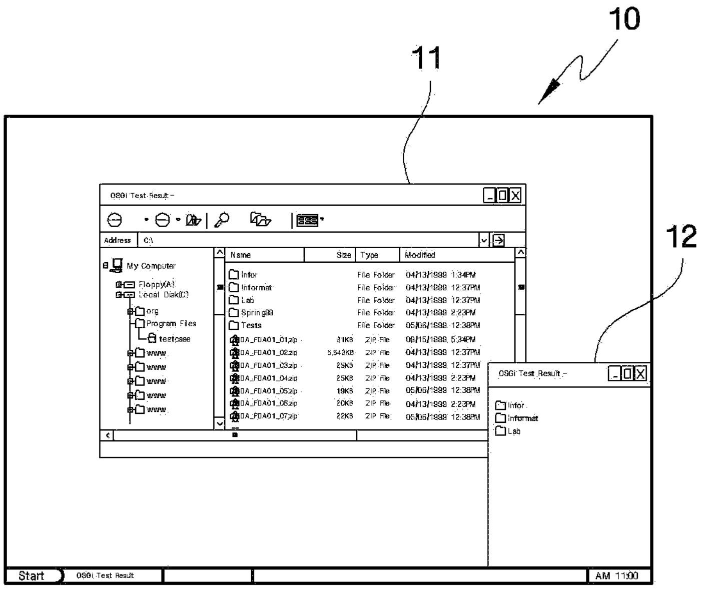
FIG. 1A (RELATED ART)
FIGS. 1A-1D illustrate a conventional display and management of windows on a screen of a computer monitor.
Figure 1B:
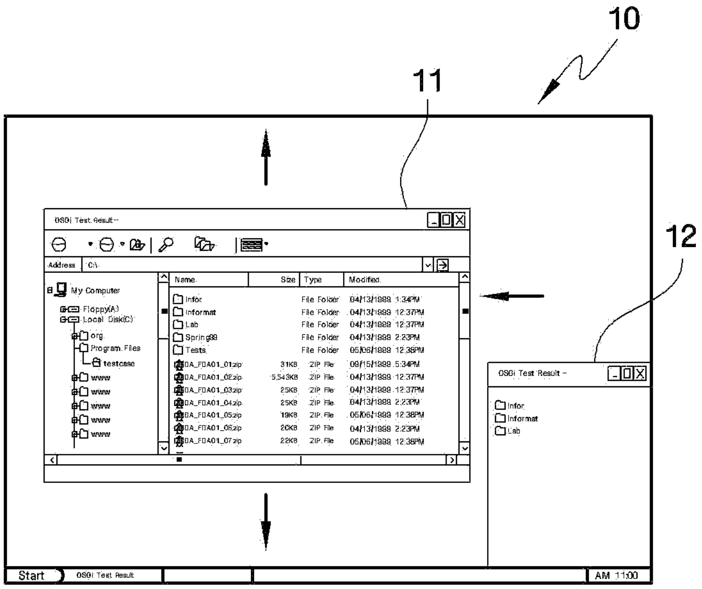
FIG. 1B (RELATED ART)
Figure 1C:
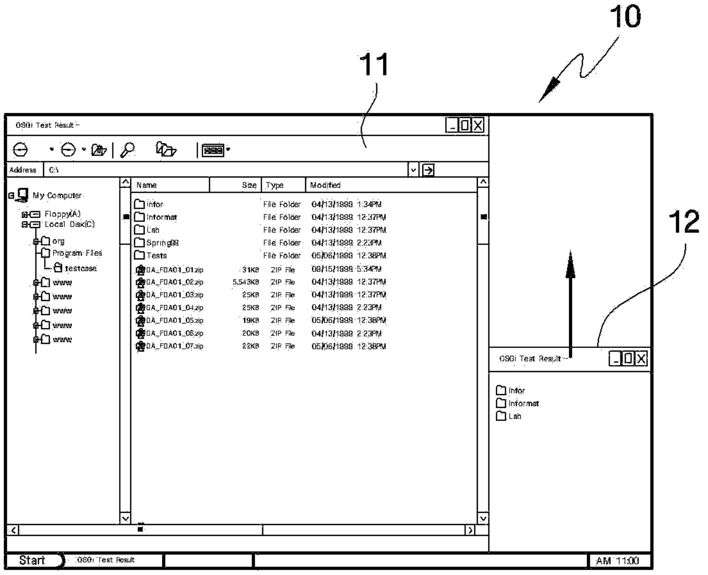
FIG. 1C (RELATED ART)
Figure 1D:
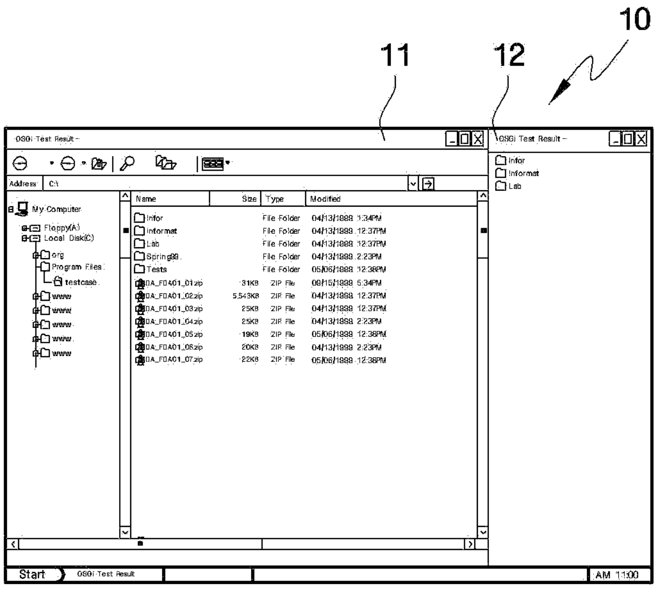
FIG. 1D (RELATED ART)

Reference will now be made in detail to embodiments of the present invention, examples of which are illustrated in the accompanying drawings, wherein like reference numerals refer to the like elements throughout. The embodiments are described below in order to explain aspects of the present invention by referring to the figures.

Figure 2A:
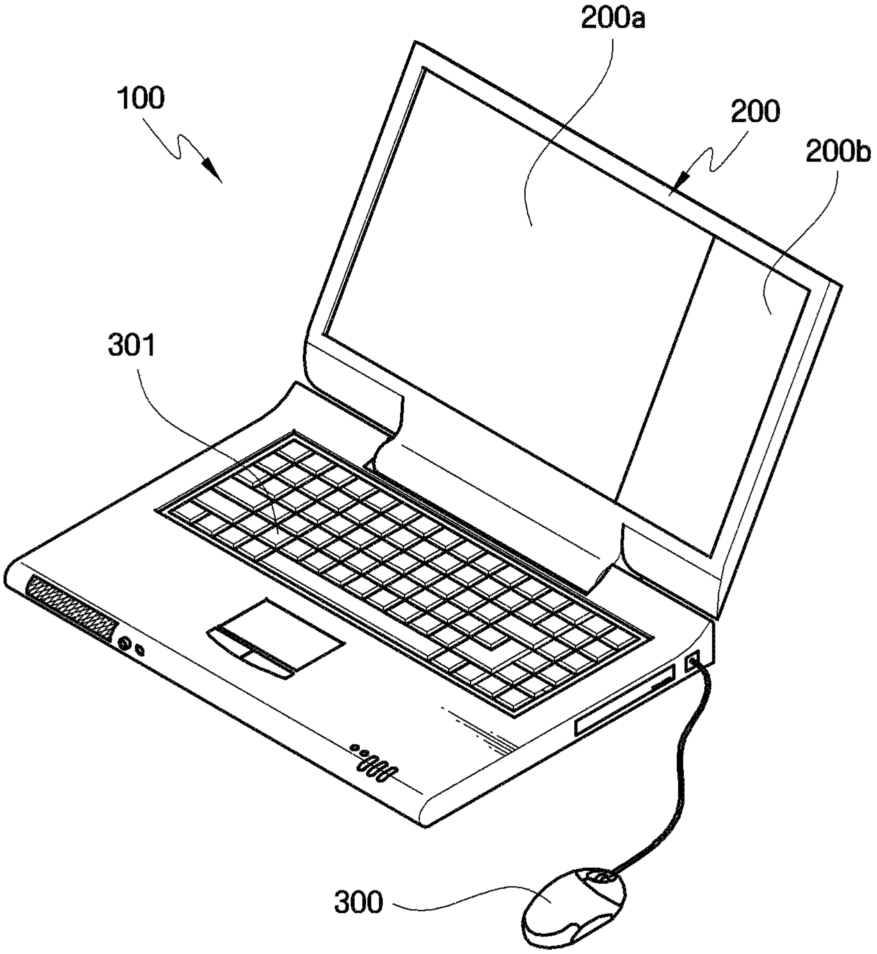
FIGS. 2A-2B illustrate an apparatus for managing the layout of a window, according to an embodiment of the present invention.

FIG. 2A illustrates an apparatus for managing the layout of a window, according to an embodiment of the present invention. As shown in FIG. 2A, an apparatus 100 for managing the layout of a window includes a display device 200, a pointer input device 300, and a keyboard input device 301. In one aspect of the present invention, one or more standard keys of the keyboard input device 301 are used to manage the layout of a window. In another aspect of the present invention, the keyboard input device 301 includes one or more designated keys for managing the layout of a window. In another aspect of the present invention, the management of the layout of a window is performed via the pointer input device 300. In yet another aspect of the preset invention, the management of the layout of a window is performed by using both the keyboard input device 301 and pointer input device 300.

The display device 200 displays program windows. In the embodiment of the present invention shown in FIG. 2A, the display device 200 is divided into a plurality of display areas, a first display area 200*a* and a second display area 200*b*. Further, the first display area 200*a* and the second display area 200*b* are divided by a predetermined ratio, and the division ratio can be set and changed by a user.

Figure 2B:
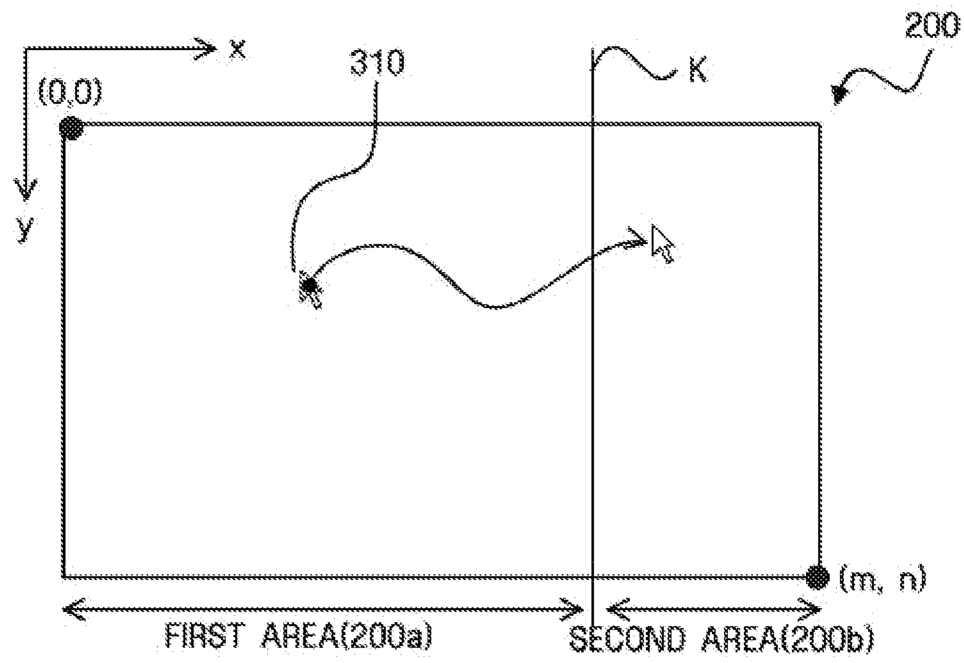

In FIG. 2B, an example of the position of the pointer 310 positioned in a predetermined area of the display device 200 is shown. As illustrated in FIG. 2B, the display device 200 includes a display area having an m-pixel width and an n-pixel height, with the upper-left side of the display area set as (0, 0), and the lower-right side set as (m, n). An example of (m, n) is (1024, 768). The user moves the pointer input device 300 (of FIG. 2A) to change the position of a pointer 310 on the display device 200. The user may also operate the pointer input device 300 by clicking or double-clicking a button on the pointer input device 300. In order to omit repetition of the phrase "via the pointer input device 300," throughout the following description, it is assumed the user manipulates (clicks on, drags, moves, etc.) the windows via the pointer input device 300 in a customary manner.

The position of a pointer 310 positioned in a predetermined display area can be checked as described in the following. In this example, it is assumed that the division ratio of the first display area 200*a* and the second display area 200*b* is 7:3, and the boundary line of the first display area 200*a* and the second display area 200*b* is K.

First, when a user clicks on a window (an example of which is 210 of FIG. 4A), and then releases the window using the pointer input device 300, the x-coordinate of the pointer 310 is checked. In the example shown in FIG. 2B, the x-coordinate is checked because the display area 200 is divided vertically by K into right and left sides, the first display area 200*a* and the second display area 200*b*. If the display area 200 were divided horizontally by K into top and bottom areas, the y-coordinate of the pointer 310 (rather than the x-coordinate) would be checked. In the example shown in FIG. 2B, $x_R$ is the position of the checked pointer 310.

If the x-coordinate of the checked pointer 310 is equal to or larger than K (i.e., $x_R \geq K$), the pointer 310 is determined to be positioned in the second display area 200*b*. If the x-coordinate of the checked pointer 310 is smaller than K (i.e., $x_R < K$), the pointer 310 is determined to be positioned in the first display area 200*a*.

As an example, a window is displayed in the first display area 200*a*, and the user click-holds to select and move the window via the pointer 310. After the window is selected and moved by the user, when the pointer 310 is released in the second display area 200*b*, the x-coordinate of the pointer 310 is checked. As a result of the check, because the x-coordinate of the pointer 310 is larger than K, it is determined the pointer 310 is positioned in the second display area 200*b*. As such, the moved window is displayed in the second display area 200*b*.

Figure 3:
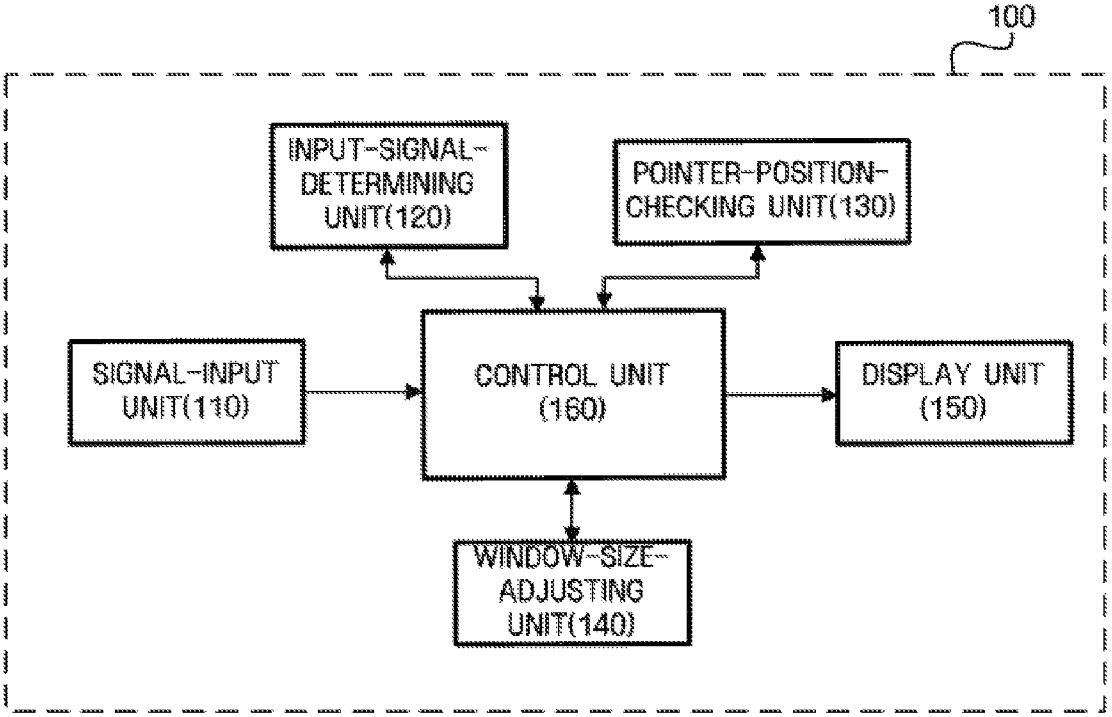
FIG. 3 is a block diagram of an apparatus for managing the layout of a window, according to another embodiment of the present invention.

FIG. 3 is a block diagram of an apparatus for managing the layout of a window according to an embodiment of the present invention. As shown in FIG. 3, an apparatus 100 for managing the layout of a window includes a signal-input unit 110, an input-signal-determining unit 120, a pointer-position-checking unit 130, a window-size-adjusting unit 140, a display unit 150, and a control unit 160. The display unit 150 displays the window of a program executed according to the operation command of the user. The control unit 160 controls operation of functional blocks 110 to 150 constituting the apparatus 100 for managing the layout of a window.

A signal generated by the user is input into the control unit 160, via the signal-input unit 110. When a predetermined signal is input into the signal-input unit 110, the input-signal-determining unit 120 determines the type of the inputted signal. The input-signal-determining unit 120 determines if the inputted signal is a click signal, a double-click signal, a release signal, or one of the other predetermined ways that the user can operate the pointer input device 300.

If the input signal is a release signal, the pointer-position-checking unit 130 checks the x-coordinate of the pointer 310 (or the y-coordinate of the pointer 310 if the display area is divided vertically). The pointer-position-checking unit 130 checks the position of the x-coordinate of the pointer 310, and based on the position of the checked pointer 310, determines which of the display areas (i.e., the first display area 200*a* or the second display area 200*b*) the pointer 310 is located in based on the divided coordinate information of the display area.

As an example, assume that the size of the display area of the display device 200 is 1024×768 and the division ratio of the first display area 200*a* and the second display area 200*b* is 7:3. If the x-coordinate of the pointer 310 is 800, the pointer-position-checking unit 130 determines that the position of the pointer 310 is within the second display area 200*b*. Alternatively, assume that the size of the display area is 1024×768 and the division ratio is 8:2. In this case, if the x-coordinate of the pointer 310 checked by the pointer-position-checking unit 130 is 800, the pointer-position-checking unit 130 determines that the position of the pointer 310 is within the first display area 200*a*.

The window-size-adjusting unit 140 then moves the window to the determined display area (i.e., the first display area 200*a* or the second display area 200*b*) where the pointer 310 is positioned, based on the result of the pointer-position-checking unit 130. In one aspect of the present invention, the window-size-adjusting unit 140 then automatically changes the size of the window in proportion to the size of the determined display area. In a different aspect of the present invention, the window-size-adjusting unit 140 changes the size of the window in proportion to the size of the determined display area if the title bar 230 (an example of which is shown in FIG. 4B) of the window is double-clicked. Examples of ways of adjusting the size of the window displayed on a screen will be described below with reference to FIGS. 4A-4B.

Figure 4A:
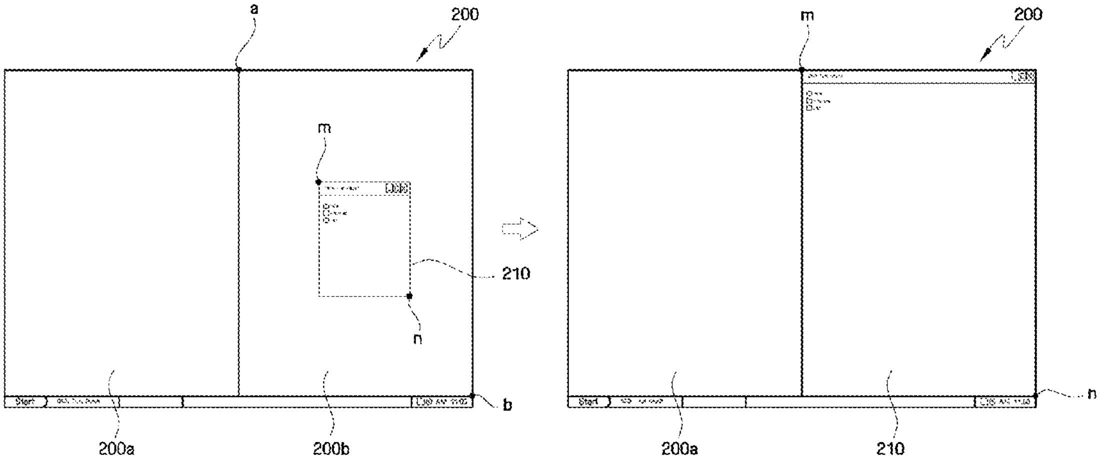
FIGS. 4A-B illustrate an example of adjusting the size of a window displayed on a display area, according to another embodiment of the present invention.
Figure 4B:
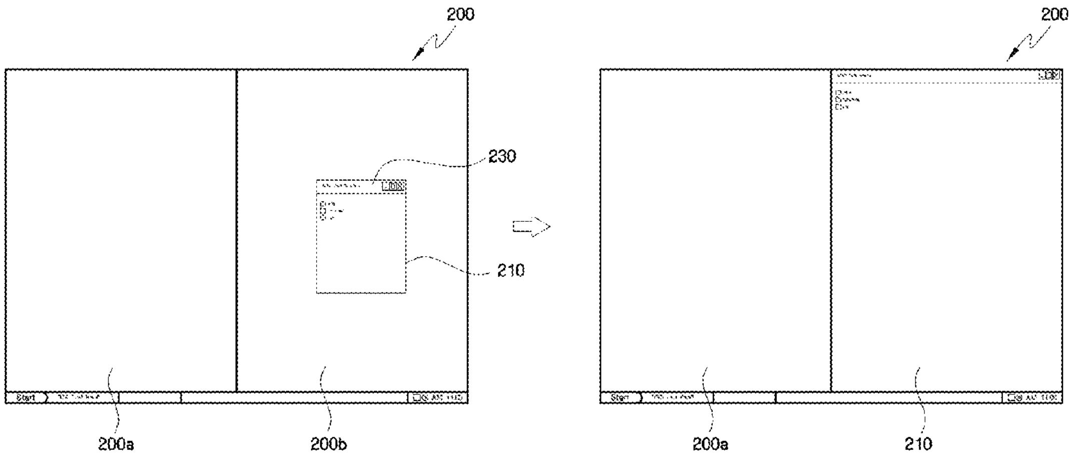

FIGS. 4A-4B illustrate an example of adjusting the size of a window 210 displayed on a display area 200 of an apparatus (100 of FIG. 2A) for managing the layout of a window according to an embodiment of the present invention. FIG. 4A illustrates an example where a window 210 is dragged to a predetermined area, and the size of the window 210 is automatically adjusted. FIG. 4B illustrates an example where a window 210 is dragged to a predetermined display area, and the user manually adjusts the size of the window.

As illustrated in FIG. 4A, it is assumed that the upper-left side of the second display area 200*b* has a vertex “a”, and the lower-right side has a vertex “b”. It is also assumed that a window 210 has a vertex “m” at the upper-left side, and the lower-right side has a vertex “n”. When the window 210 is dragged to the second display area 200*b* by the user and released, the window-size-adjusting unit 140 (of FIG. 3) changes the vertex values (i.e., m and n) of the dragged window into the vertex values (i.e., a and b) of the second display area 200*b*. Hence, the size of the window 210 is changed so that it is equal to the size of the second display area 200*b*. When setting the vertex values, the window-size-adjusting unit 140 takes into account any standard window features of the second display area 200*b*, such as a title bar, a shadow, a border, or other comparable attributes, so as to display the window 210 in its maximized state.

Alternatively, as illustrated in FIG. 4B, when the window 210 is dragged to the second display area 200*b* and released, the window 210 is displayed on the second display area 200*b*. Then, if the user double-clicks a title bar 230, the size of the window 210 is changed in proportion to the size of the second display area 200*b*. Alternatively, the size of the window 210 could be adjusted when the user clicks a designated button on the pointer input device 300, presses a designated key on the keyboard 310, or performs a designated mouse gesture with the pointer input device 300, rather than by double-clicking the title bar 230.

Figure 5:
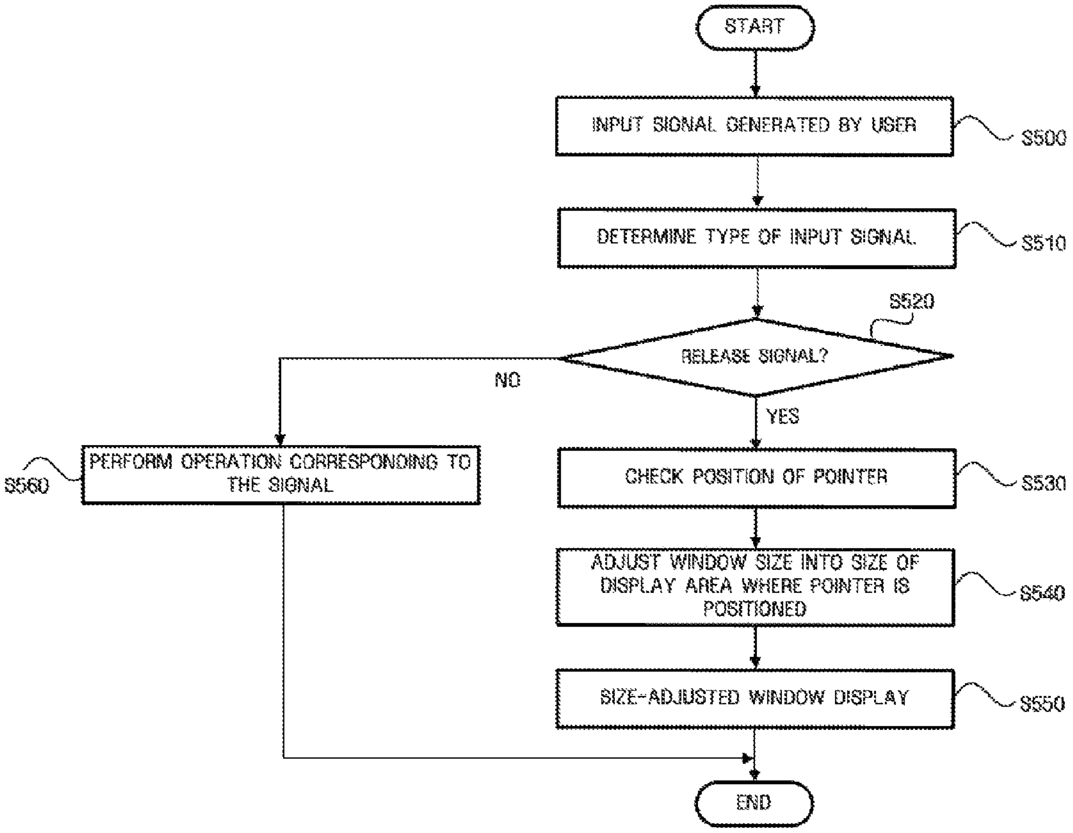
FIG. 5 illustrates a method of managing the layout of a window, according to another embodiment of the present invention.

FIG. 5 illustrates a method of managing the layout of a window according to another embodiment of the present invention. In the following example, it is assumed that the display area of the display device 200 is divided into the first display area 200*a* and the second display area 200*b*.

When a user executes a predetermined program, the window 210 corresponding to the display area is displayed on the display device 200. When the user selects the window 210 with the pointer 310, drags the window 210 to a certain display area (e.g., the second display area 200*b*), and releases the window 210, the signal-input unit 110 is input a signal generated by the user (S500).

The input-signal-determining unit 120 determines the type of the input signal (S510). If the input signal is a release signal (S520), the point-position-checking unit 130 checks the position of the pointer 310, and determines in which display area the pointer 310 is positioned (S530). Details thereof have been described above with reference to FIG. 2B, and thus are omitted here.

Then, the window-size-adjusting unit 140 moves the window 210 to the display area (e.g., the first display area 200*a*) where the pointer 310 is positioned, based on the result of the determination of the pointer-position-checking unit 130. The window-size-adjusting unit 140 then adjusts the size of the moved window 210 in proportion to the size of the display area (e.g., the first display area 200*a*). As detailed above with reference to FIG. 4B, the window size is adjusted by double-clicking the title bar 230 of the window 210, a predetermined user input via the pointer input device 300 or the keyboard input unit 301, or is adjusted automatically after the release signal. Then, the size-adjusted window 210 is displayed by the display unit 150 (S550).

If the result of the determination of the input-signal-determining unit 120 is that the input signal is not a release signal (S520), a predetermined operation corresponding to the input signal is performed (S560).

Additionally, the division ratio of the display areas can be arbitrarily changed by the user. FIGS. 6A-6H illustrate an example where multiple windows are arranged and managed on a display area according to another embodiment of the present invention.

Figure 6A:
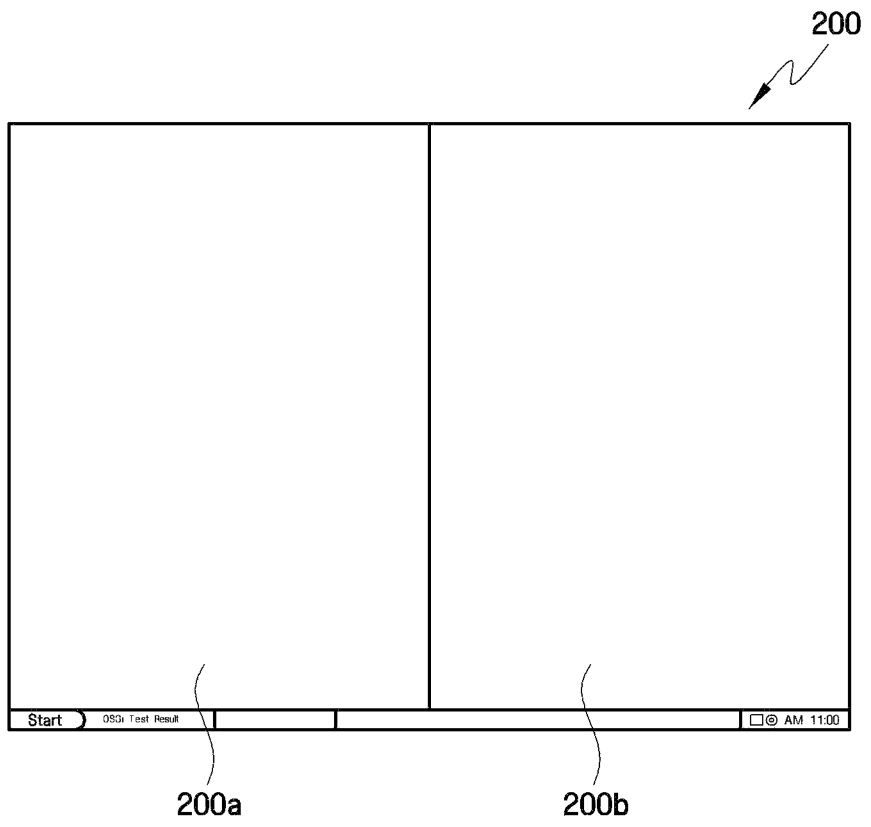
FIGS. 6A-6H illustrate an example where multiple windows are arranged on a display area, according to another embodiment of the present invention.

As illustrated in FIG. 6A, the display area of the display device 200 is divided into the first display area 200*a* and the second display area 200*b*. In FIG. 6A, the division ratio of the first display area 200*a* and the second display area 20*b* is 1:1.

Figure 6B:
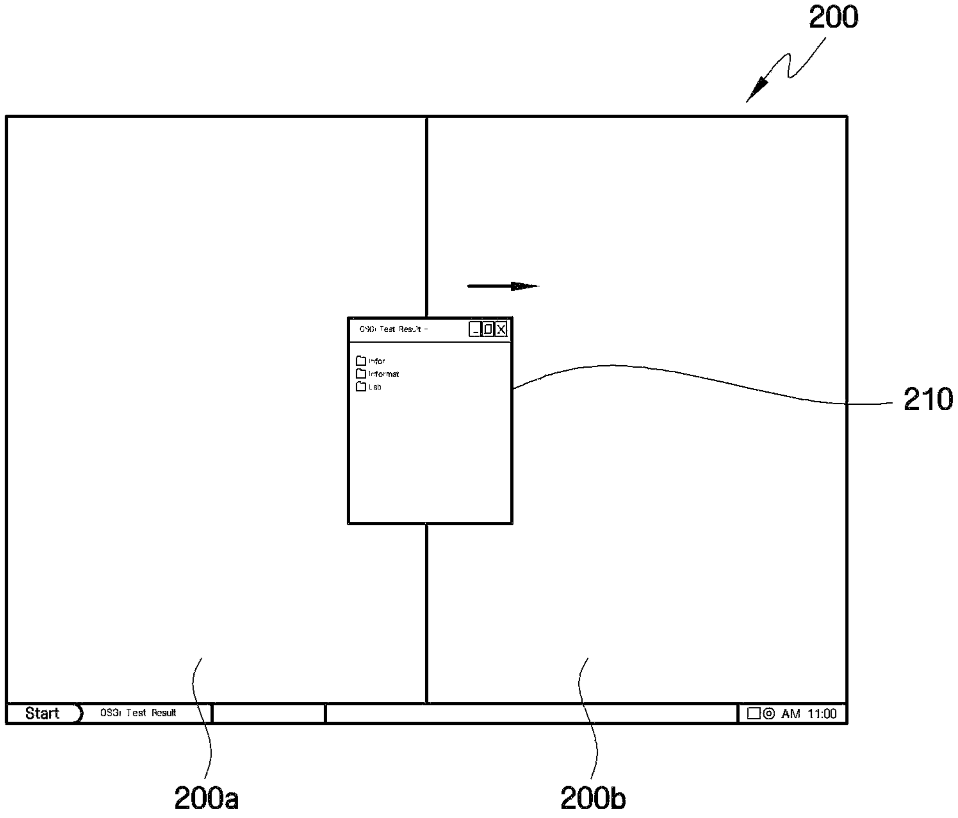
Figure 6C:
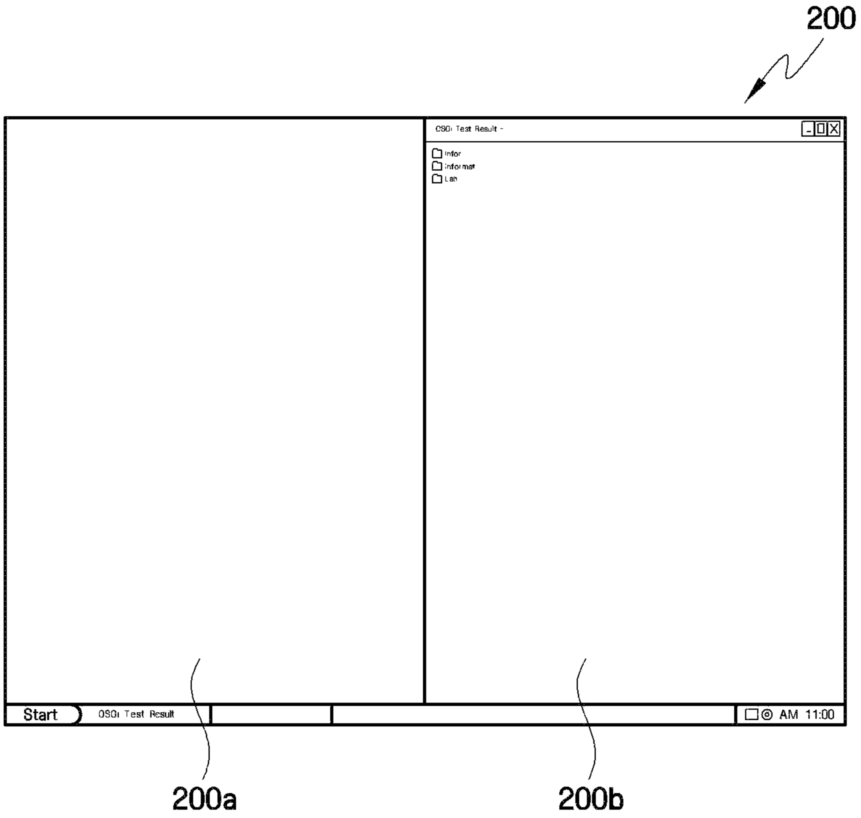

As shown in FIG. 6B, if the user executes a predetermined program, the window 210 of the program is displayed and spans the first display area 200*a* and the second display area 200*b*.

Then, when the user selects the window 210 via the pointer 310, drags the window 210 to a certain display area (e.g., the second display area 200*b*), and releases the window 210, the pointer-position-checking unit 130 determines that the pointer 310 is positioned in the second display area 200*b* by checking the current position of the pointer 310.

After determining the pointer 310 is in the second display area 200*b*, the window-size-adjusting unit 140 moves the window 210 to the second display area 200*b*. As described above with reference to FIGS. 4A-4B, the size of the window 210 is adjusted by the window-size-adjusting unit 140 checking the vertex values of the upper-left side and the lower-right side of the second display area 200*b*, and changing the size of the window 210 in proportion to the size of the checked second display area 200*b*. The size of the window 210 is adjusted by double-clicking the title bar 230 of the window 210, a predetermined user input via the pointer input device 300 or the keyboard input unit 301, or is adjusted automatically after the release signal. When setting the vertex values, the window-size-adjusting unit 140 takes into account any standard window features of the second display area 200*b*, such as a title bar, a shadow, a border, or other comparable attributes, so as to display the window 210 in its maximized state.

Figure 6D:
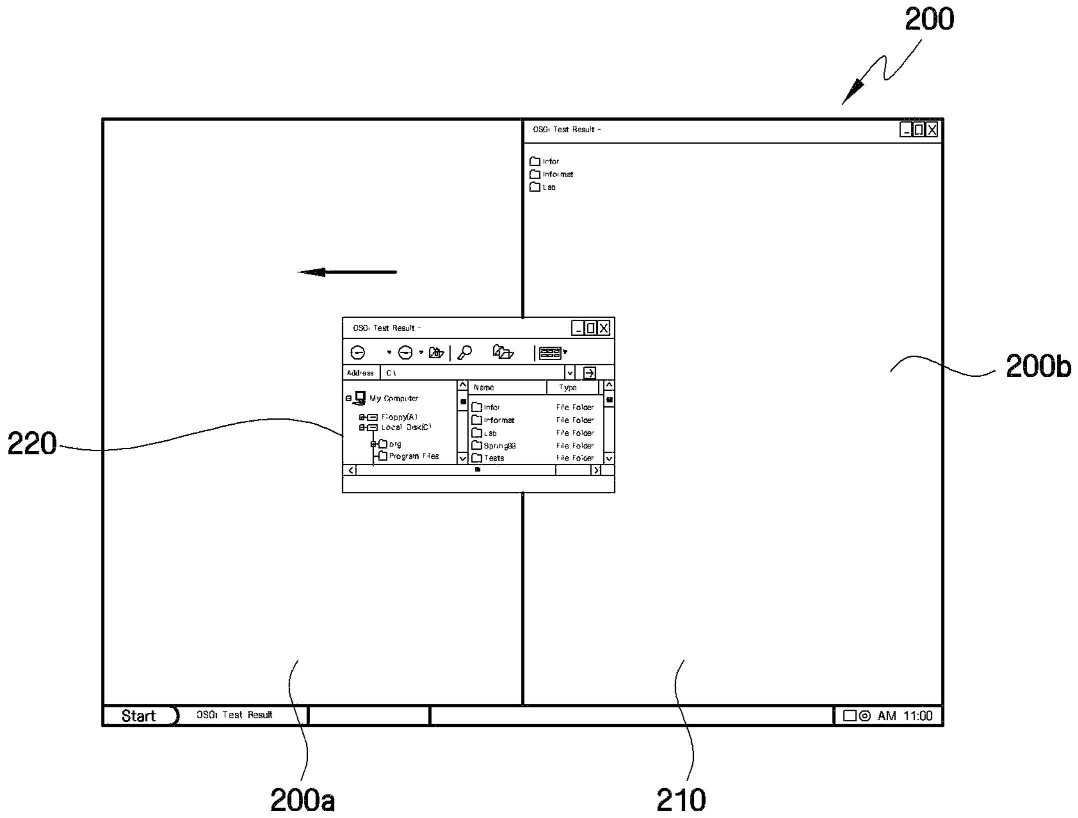

As illustrated in FIG. 6D, if the user executes a second program, the window 220 of the second program is displayed and spans the first display area 200*a* and the second display area 200*b*. The user selects the window 220 via the pointer 310, drags the selected window 220 to the first display area 200*a*, and releases the window 220. The pointer-position-checking unit 130 then determines that the pointer 310 is positioned in the first display area 200*a*. The window-size-adjusting unit 140 then moves the window 220 to the first display area 200*a*. As described above with reference to FIGS. 4A-4B, the size of the window 220 is adjusted by the window-size-adjusting unit 140 checking the vertex values of the upper-left side and the lower-right side of the first display area 200*a*, and changing the size of the window 220 in proportion to the size of the first display area 200*a*. The window-size-adjusting unit 140 changes the size of the window 220 either automatically, when the user double-clicks the title bar 230 of the window 220, or when the user enters a predetermined user input via the pointer input device 300 or the keyboard input unit 301. When setting the vertex values, the window-size-adjusting unit 140 takes into account any standard window features of the first display area 220*a*, such as a title bar, a shadow, a border, or other comparable attributes, so as to display the window 220 in its maximized state.

Figure 6E:
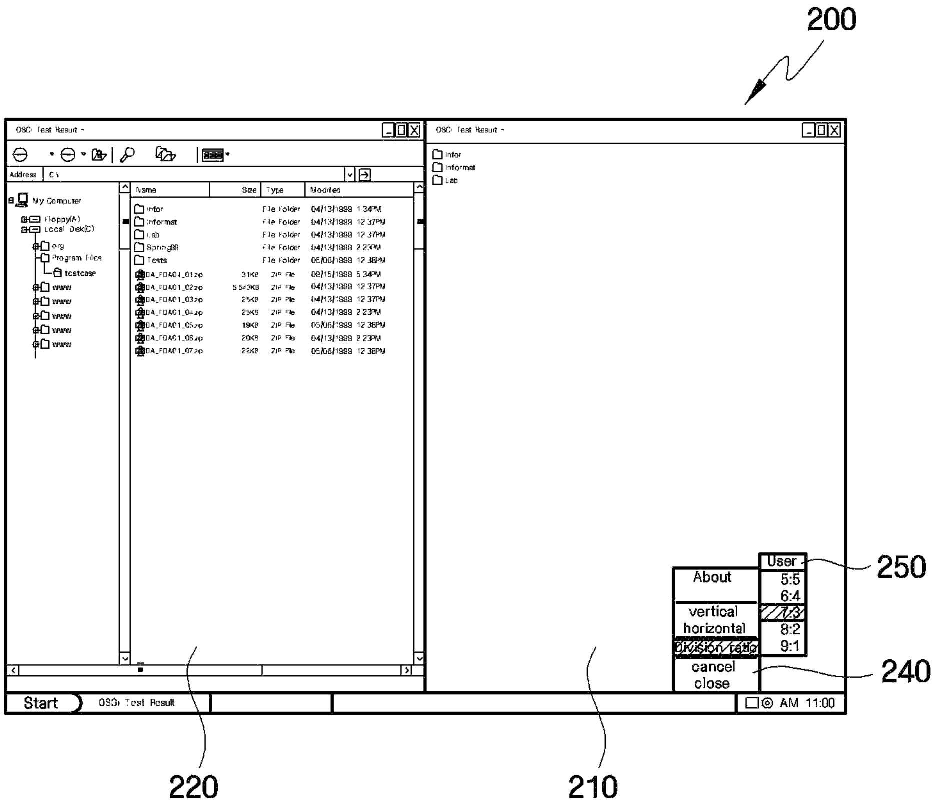

As illustrated in FIG. 6E, the windows 220 and 210 of different programs are displayed in a maximized state in the first display area 200*a* and the second display area 200*b*. If the user wants to adjust the division ratio of the display area, the user calls the menu 240 and changes the division ratio. The user can select a predetermined ratio from the list of menu 240, or the user can enter an arbitrary value in the sub-menu 250.

Figure 6F:
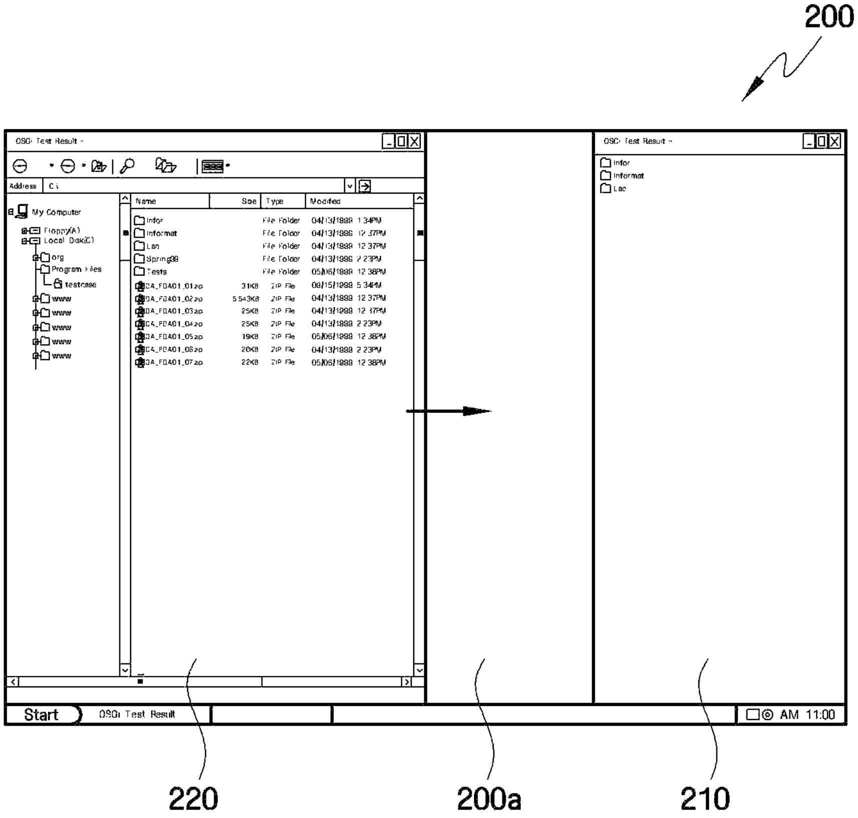
Figure 6G:
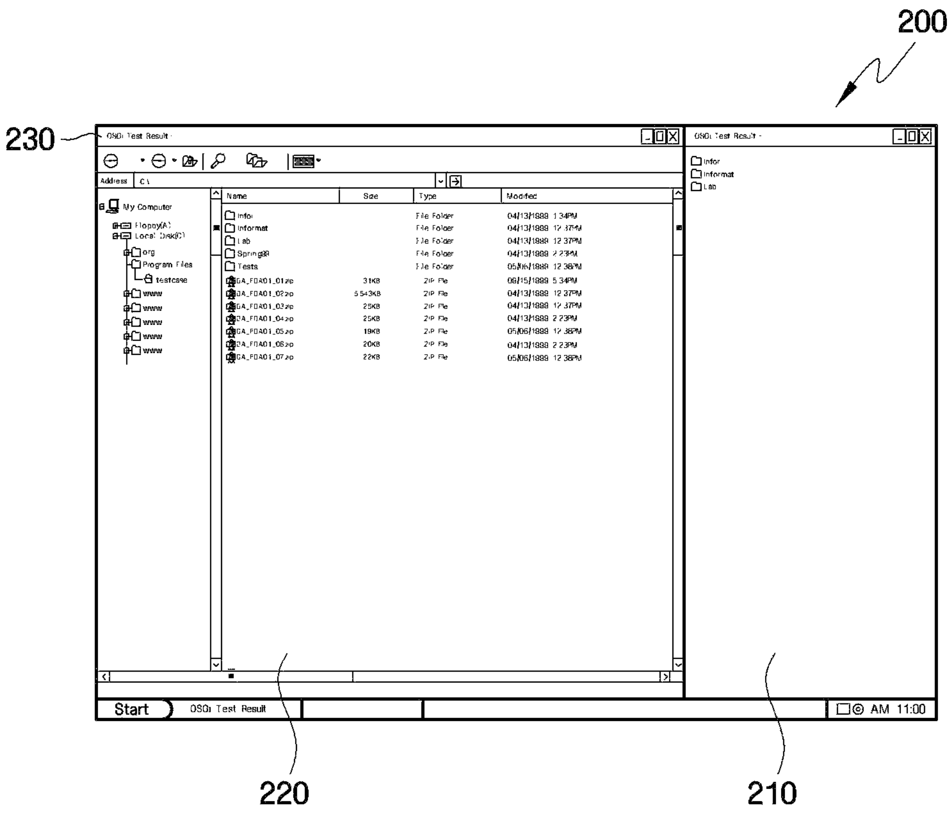

An example of a changed division ratio is illustrated in FIG. 6F. In FIG. 6F, the division ratio of the first display area 200*a* and the second display area 200*b* is changed by the user from 1:1 to 7:3. The sizes of the first and second display areas 200*a* and 200*b* are changed by the window-size-adjusting unit 140. The window-size-adjusting unit 140 checks the vertex values of the upper-left side and the lower-right corner of the first and second display areas 200*a* and 200*b*, and changes the size of the windows 220 and 210 in proportion to the size of the first and second display areas. When changing the size of the windows 220 and 210, the window-size-adjusting unit 140 takes into account any standard window features of the display areas 200*a* and 200*b*, such as title bars, shadows, borders, or other comparable attributes, so as to display the windows 210 and 220 in their maximized state. As illustrated in FIG. 6G, the size-adjusted windows 220 and 210 are automatically displayed according to the new setting of the division ratio of the display area of the display device 200.

Hence, when the user moves a window to a display area where the user wants it displayed, the size of the display area where the window is positioned is checked, and the size of the window is adjusted, and thus the user does not need to adjust the size of each window to prevent overlapping.

Figure 6H:
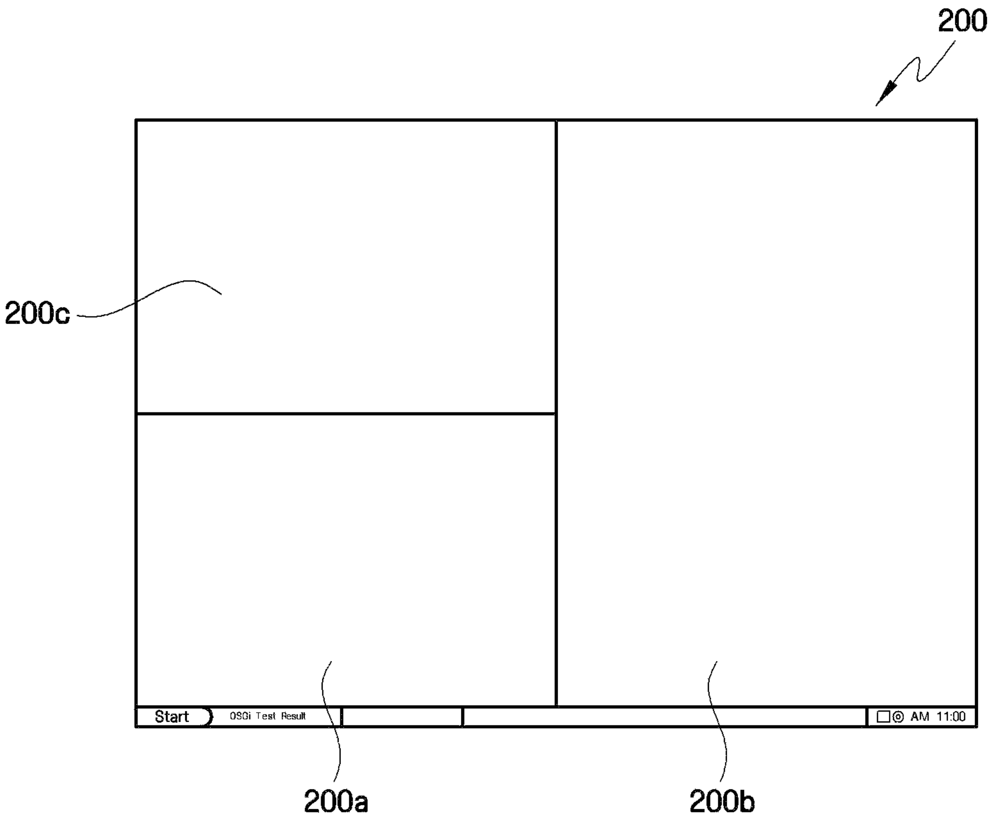

Aspects of the present invention allow for additional divisions (more than two) of the display device 200 and more complex divisions of the display device 200 than simple horizontal or vertical divisions. FIG. 6H is an illustration showing that the divisions of the display device 200 to create the plurality of display areas are not limited to simple horizontal or vertical divisions, but that the divisions can be a combination of both horizontal and vertical divisions. In FIG. 6H, the divisions create three display areas: a first display area 200*a*, a second display area 200*b*, and a third display area 200*c*. It should be understood by those of ordinary skill in the art that the number and arrangement of divisions of the display areas are limited only by the constraints of the display device 200 and the wishes of the user. It should also be understood that the division ratio to set the relative sizes of the display areas could constitute more than a X:Y ratio (for two display areas) and can constitute as many ratio values as there are display areas (X:Y:Z for the ratio of three display areas, for example). It is also understood that in such a multi-display area embodiment where the position of the pointer 310 is checked, both the x and y coordinates of the pointer 310 would be checked to determine which display area the pointer is located in, in a manner similar to the single coordinate methods detailed above.

Figure 7:
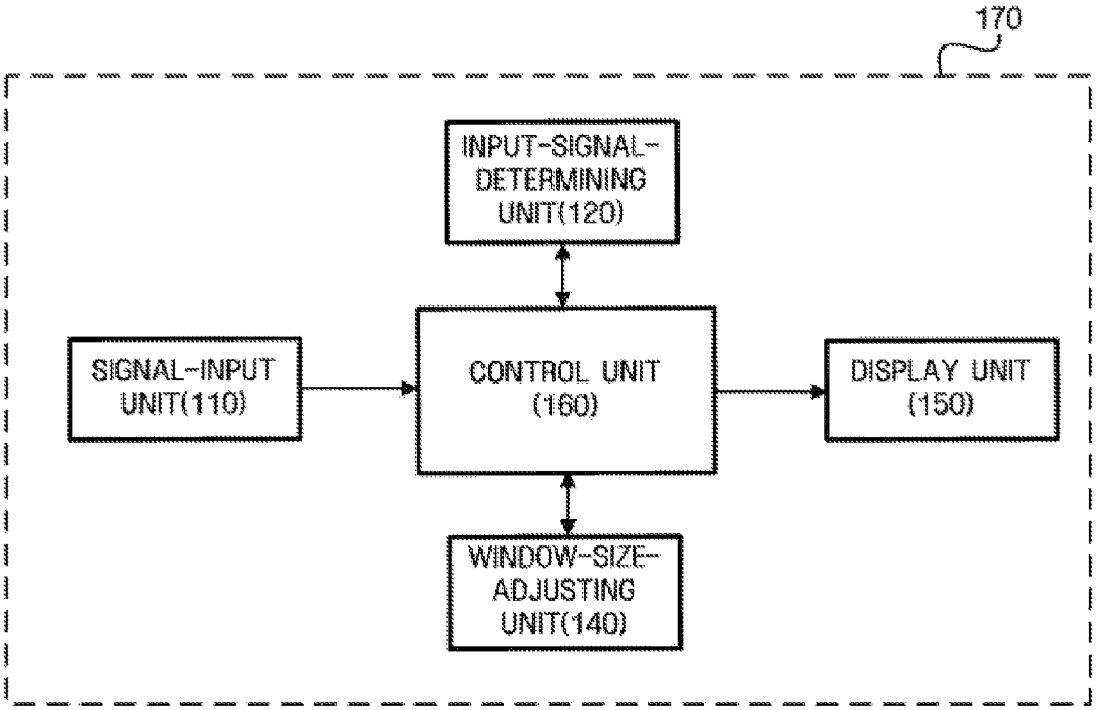
FIG. 7 is a block diagram of an apparatus for managing the layout of a window according to another embodiment of the present invention.

FIG. 7 is a block diagram of an apparatus for managing the layout of a window according to another embodiment of the present invention. As shown in FIG. 7, in a manner similar to that of FIG. 3 and described above, an apparatus 170 for managing the layout of a window includes a signal-input unit 110, an input-signal-determining unit 120, a window-size-adjusting unit 140, a display unit 150, and a control unit 160. The display unit 150 displays the window of a program executed according to the operation command of the user. The control unit 160 controls operation of functional blocks 110, 120, 140, and 150 constituting the apparatus for managing the layout of a window The signal-input unit 110 receives an input signal generated by the user, such as the user pressing a key on the keyboard input unit 301. The input-signal-determining unit 120 determines the display area designated by the input signal. For example, using FIG. 6B, a designated key on the keyboard input unit 301 designates the second display area 200*b*, and when pressed moves the window 210 to the second display area 200*b*. Alternatively, another designated key could designate the first display area 200*a*, and when pressed would instead move the window 210 to the first display area 200*a*.

The window-size-adjusting unit 140 then moves the window 210 to the designated display area (i.e., the first display area 200*a* or the second display area 200*b*) corresponding to the input. In one aspect of the present invention, the window-size-adjusting unit 140 then automatically changes the size of the window 210 in proportion to the size of the display area. In a different aspect of the present invention, the window-size-adjusting unit 140 changes the size of the window 210 in proportion to the size of the designated displayed area after an input from the user, via the signal-input unit 110. The adjustment of the size of the window 210 is done by the window-size-adjusting 140 setting the vertex values of the window 210 to those of the designated display area. When setting the vertex values, the window-size-adjusting unit 140 takes into account any standard window features of the one display area, such as a title bar, a shadow, a border, or other comparable attributes, so as to display the window 210 in its maximized state.

The method and apparatus of aspects of the present invention have the following advantages.

First, because one display device is divided into multiple display areas, multiple windows are not overlapped when multiple windows are displayed.

Second, if a window is positioned in a predetermined display area, the size of the window is adjusted in proportion to the size of the display area, and thus the user does not need to manually adjust the window size.

Third, because the user can arbitrarily change the division ratio of a plurality of display areas, the plurality of display areas can be conveniently utilized depending on the requirements of the user.

In the embodiments of the present invention described above, the term "unit", indicates, but is not limited to, a software or hardware component, such as a Field Programmable Gate Array (FPGA) or an Application Specific Integrated Circuit (ASIC), which performs certain tasks. A unit may be configured to reside on an addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented so as to execute on one or more CPUs in a device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:

a display unit;

a pointer input device operable to control a coordinate position of a pointer displayed on the display unit;

a window layout unit to divide the display unit into a first display area and a second display area and to control a layout of a window;

a pointer-position-checking unit to determine a coordinate position of the pointer displayed on the display unit moved via the pointer input device; and a window-size-adjusting unit operable to adjust the size of the window in proportion to the size of one of the first and second display areas such that if the window is moved to the first display area, the size of the window displayed in the first display area is proportionally adjusted in the first display area, and if the window is moved to the second display area, the size of the window displayed in the second display area is proportionally adjusted in the second display area.

2. The apparatus of claim 1, wherein the pointer-position-checking unit is configured to determine one of the first and second display areas corresponding to the coordinate position of the pointer in response to a user input command received via the pointer input device, and wherein the window-size-adjusting unit is operable to adjust the size of the window in proportion to the size of one of the first and second display areas corresponding to the coordinate position of the pointer such that if the window is displayed in the first display area and the pointer-position-checking unit determines that the coordinate position of the pointer corresponds to the first display area, the size of the window displayed in the first display area is proportionally adjusted in the first display area, and if the window is displayed in the second display area and the pointer-position-checking unit determines that the coordinate position of the pointer corresponds to the second display area, the size of the window displayed in the second display area is proportionally adjusted in the second display area.

3. The apparatus of claim 1, wherein the first display area and the second display area are divided according to a ratio set via a user input command.

4. The apparatus of claim 1, wherein the pointer-position-checking unit determines the coordinate position of the pointer in response to receiving a signal corresponding to a clicking or double-clicking a button on the pointer input device.

5. The apparatus of claim 1, wherein the pointer-position-checking unit determines one of the first and second display areas corresponding to the coordinate position of the pointer by identifying which one of the first and second display areas the pointer is located in based on a divided coordinate information of the display areas.

6. The apparatus of claim 1, wherein the window-size-adjusting unit adjusts the size of window in response to receiving a user input signal.

* * * * *